(12) United States Patent
Kim et al.

(10) Patent No.: US 7,933,917 B2
(45) Date of Patent: Apr. 26, 2011

(54) PERSONALIZED SEARCH METHOD AND SYSTEM FOR ENABLING THE METHOD

(75) Inventors: Young Kwan Kim, Gyeonggi-do (KR); Joon Ho Lee, Seoul (KR); Jang Won Seo, Seoul (KR)

(73) Assignee: NHN Corporation, Seongnam-si (KR)

( * ) Notice: Subject to any disclaimer, the term of this patent is extended or adjusted under 35 U.S.C. 154(b) by 365 days.

(21) Appl. No.: 11/911,664

(22) PCT Filed: May 8, 2006

(86) PCT No.: PCT/KR2006/001716
§ 371 (c)(1),
(2), (4) Date: Oct. 15, 2007

(87) PCT Pub. No.: WO2006/121269
PCT Pub. Date: Nov. 16, 2006

(65) Prior Publication Data
US 2008/0195588 A1      Aug. 14, 2008

(30) Foreign Application Priority Data

May 6, 2005   (KR) .................. 10-2005-0037926
May 9, 2005   (KR) .................. 10-2005-0038386

(51) Int. Cl.
*G06F 17/30*      (2006.01)
(52) U.S. Cl. ........ 707/769; 707/706; 707/716; 707/726; 707/770; 707/E17.014; 707/E17.029; 707/E17.069; 707/999.001; 707/999.003
(58) Field of Classification Search .................. None
See application file for complete search history.

(56) References Cited

U.S. PATENT DOCUMENTS

| | | | |
|---|---|---|---|
| 6,529,899 B1* | 3/2003 | Kraft et al. ....................... | 1/1 |
| 6,691,104 B1* | 2/2004 | Kraft et al. ....................... | 1/1 |
| 7,747,649 B2* | 6/2010 | Benson ........................ | 707/791 |
| 2003/0177111 A1* | 9/2003 | Egendorf et al. ................ | 707/3 |
| 2004/0015538 A1* | 1/2004 | Agarwalla et al. ............ | 709/203 |
| 2005/0131866 A1* | 6/2005 | Badros et al. ................... | 707/3 |
| 2005/0193020 A1* | 9/2005 | Shkedi ...................... | 707/104.1 |
| 2007/0022098 A1* | 1/2007 | Malik ............................. | 707/3 |

FOREIGN PATENT DOCUMENTS

| | | |
|---|---|---|
| KR | 10-2000-0063422 | 11/2000 |
| KR | 10-2000-0072482 | 12/2000 |
| KR | 10-2002-0003915 | 1/2002 |
| WO | WO 99-62008 | 12/1999 |

* cited by examiner

*Primary Examiner* — Don Wong
*Assistant Examiner* — Andalib F Lodhi
(74) *Attorney, Agent, or Firm* — H.C. Park & Associates, PLC

(57) ABSTRACT

A method and system for storing information on a search result selected by a user with respect to a predetermined query, reflecting the user's preference by utilizing the information when the user inputs an identical query and requests a search, and providing a personalized search result in which user preferences are reflected. More particularly, a personalized search method and system utilizing favorites of a web browser in which a personalized search result is provided to each user by utilizing information on a website that the user bookmarked as the user's favorites is provided. According to the present invention, there is provided a personalized search service method and system which can provide a user with a personalized search service, even when user information is not stored in a search server and also, even when the user does not log in.

23 Claims, 15 Drawing Sheets

QUERY:FLOWER DELIVERY    UPDATING POINT IN TIME - 2005.04.06

URL1:http://www.119flower.co.kr
    NUMBER OF SELECTIONS-3, SELECTION POINT IN TIME-2005.04.06
URL2:http://www.leadersflower.co.kr
    NUMBER OF SELECTIONS-1, SELECTION POINT IN TIME-2005.03.31
URL3:http://www.flowercity.co.kr
    NUMBER OF SELECTIONS-1, SELECTION POINT IN TIME-2005.03.27
URL4:http://www.mbcflower.co.kr
    NUMBER OF SELECTIONS-2, SELECTION POINT IN TIME-2005.03.05

FIG. 8

QUERY: FLOWER DELIVERY     GENERATION POINT IN TIME - CURRENT POINT IN TIME

URL1: http://www.119flower.co.kr
   NUMBER OF SELECTIONS-3, SELECTION POINT IN TIME-2005.04.06

URL2: http://www.leadersflower.co.kr
   NUMBER OF SELECTIONS-1, SELECTION POINT IN TIME-2005.03.31

URL3: http://www.flowercity.co.kr
   NUMBER OF SELECTIONS-1, SELECTION POINT IN TIME-2005.03.27

URL4: http://www.mbcflower.co.kr
   NUMBER OF SELECTIONS-2, SELECTION POINT IN TIME-2005.03.05

URL5: http://www.rosezone.co.kr,
   NUMBER OF SELECTIONS-1, SELECTION POINT IN TIME- CURRENT POINT IN TIME    801

FIG. 9

KEYWORD : FLOWER DELIVERY    GENERATION POINT IN TIME -
                             CURRENT POINT IN TIME

URL1:http://www.rosezone.co.kr
    NUMBER OF SELECTIONS -1, SELECTION POINT IN TIME -
    CURRENT POINT IN TIME

FIG. 10

QUERY:JEJUDO TOUR    GENERATION POINT IN TIME - 2005.01.03

URL1:http://www.egaya.co.kr
    NUMBER OF SELECTIONS-1, SELECTION POINT IN TIME-2005.01.03
URL2:http://www.dudutour.co.kr
    NUMBER OF SELECTIONS-1, SELECTION POINT IN TIME-2005.01.03
URL3:http://www.jejutop.co.kr
    NUMBER OF SELECTIONS-1, SELECTION POINT IN TIME-2005.01.03
URL4:http://www.plusjejumall.co.kr
    NUMBER OF SELECTIONS-1, SELECTION POINT IN TIME-2005.01.03
URL5:http://www.jdtour.co.kr,
    NUMBER OF SELECTIONS-1, SELECTION POINT IN TIME-2005.01.03

INVALIDATION INFORMATION — 1001

FIG. 16

< PERSONALIZED SEARCH DB >

| CATEGORY NAME | SITE NAME | NETWORK ADDRESS |
|---|---|---|
| TRANSLATION | MOBICO TRANSLATION CENTER | www.mobico.com |
| TRANSLATION | LEXFEEL TRANSLATION CENTER | www.lexfeel.com |
| TRANSLATION >> INTERPRETATION | ITS INTERPRETATION & TRANSLATION CENTER | www.it81.com |
| - | COMIX | www.ecomix.com |
| - | NAVER | www.naver.com |

1601

< GENERAL SEARCH DB >                                  1801

| KEYWORD | NETWORK ADDRESS | NUMBER OF REGISTRATIONS |
|---|---|---|
| TRANSLATION | www.kitc.or.kr | 14TIMES |
| TRANSLATION | www.china1472.com | 10TIMES |
| TRANSLATION OR INTERPRETATION | www.it81.com | 5TIMES |
| COMIX | www.ecomix.com | 8TIMES |
| NAVER | www.naver.com | 22TIMES |

PERSONALIZED SEARCH METHOD AND SYSTEM FOR ENABLING THE METHOD

CROSS REFERENCE TO RELATED APPLICATIONS

This application is a U.S. National Phase Application of International Application PCT Application No. PCT/KR2006/001716 filed on May 8, 2006, which claims the benefit of priority from Korean Patent Application No. 10-2005-0037926 filed on May 6, 2005 and Korean Patent Application No. 10-2005-0038386 filed on May 9, 2005. The disclosures of International-Application PCT Application No. PCT/KR2006/001716 and Korean Patent Application Nos. 10-2005-0037926 and 10-2005-0038386 are incorporated herein by reference.

TECHNICAL FIELD

The present invention relates to a method and system for storing information on a search result selected by a user with respect to a predetermined query, reflecting the user's preference by utilizing the information when the user inputs an identical query and requests a search, and providing a personalized search result in which user preferences are reflected. More particularly, the present invention relates to a personalized search method and system utilizing favorites of a web browser in which a personalized search result is provided to each user by utilizing information on a website that the user bookmarked as the user's favorites.

BACKGROUND ART

The Internet is currently connected to a large number of server networks around the world and also an enormous and effective information providing medium. The Internet is utilized for emails, newsgroups, file transmissions, information transfers, searches, etc. Also, many people express their interests in various fields of arts, literatures, sciences, medical sciences, entertainments, sports, politics, science technologies, industries, economics, etc., via their own homepage. Currently, the Internet provides a huge amount of daily news articles in association with each of these fields. Accordingly, an Internet service user utilizes an Internet search service to select and obtain only necessary information from various kinds of information.

In a conventional search method, as a user inputs a keyword, and a search result based on the keyword is provided. The user may obtain information by selecting particular information from the provided search result. However, when another user inputs the keyword, the another user may want to select different information from the provided search result. Accordingly, a personalized search method of providing a different search result for each user based on user information has started being utilized. As an example, when a user who subscribes to a search service logs into the search service and requests a search, a search system may provide the user with a specialized search result by utilizing user information with respect to the user's address, sex, occupation, etc.

However, according to the conventional art, a personalized search service may be provided only when each user's information is maintained. When the user does not log into a search service, the personalized search service may not be provided.

DISCLOSURE OF INVENTION

Technical Goals

The present invention provides a personalized search service method and system which can provide a user with a personalized search service, even when user information is not stored in a search server and also, even when the user does not log in.

The present invention also provides a personalized search method and system which can reflect an individual user's preference by generating cookie information including a query inputted from a user when requesting a search, a search result selected by the user from a search result list provided to the user in association with the query, and a number of times the search result is selected with respect to the query, and by providing a personalized search service utilizing the cookie information.

The present invention also provides a personalized search method and system which can provide a criterion for generating or updating the cookie information, so as to effectively manage the cookie information and more accurately reflect user preferences.

The present invention also provides a personalized search service utilizing a favorites list which is bookmarked to a web browser of a user terminal.

The present invention also provides a search service in which each user's preference is reflected by statistically analyzing a favorites list received from each of a plurality of user terminals.

Technical Solutions

According to an aspect of the present invention, there is provided a personalized search method including: receiving a query and cookie information from a user terminal (the cookie information including at least one search cookie, the search cookie including a query, a URL associated with the query, or a number of selections associated with the URL, and the number of selections being a number of times that a user of the user terminal selects a search result corresponding to the URL); identifying a search cookie including the received query, from the received cookie information; generating a personalized search result list including at least one personalized search result, based on a Uniform Resource Locator (URL) included in the identified search cookie; generating a search result list including at least one search result associated with the received query; and providing a user of the user terminal with the personalized search result list and the search result list according to different providing methods.

According to another aspect of the present invention, there is provided a personalized search method including: receiving a favorites list, which is set in a web browser installed in a user terminal, from the user terminal, the favorites list including at least one network address and a site name corresponding to the at least one network address; storing the at least one network address and the site name in a personalized search database, in association with the user terminal; receiving a query from the user terminal; searching the personalized search database for the site name including the query and the network address corresponding to the site name; generating a search result including a retrieved network address and generating a personalized search result list including the generated search result; and providing the user terminal with the generated personalized search result list.

According to still another aspect of the present invention, there is provided a personalized search method including: storing a network address associated with a predetermined category, in a personalized search database which is provided for each user terminal; receiving a query from the user terminal; searching the personalized search database for the category associated with the query; searching for the network address associated with a retrieved category; generating a search result including a retrieved network address and generating a personalized search result list including the generated search result; and providing the user terminal with the generated personalized search result list, wherein the storing of the network address comprises: receiving a favorites list, which is set in a web browser installed in a user terminal, from the user terminal, the favorites list including any one of a network address and a folder, and the folder including the network address; and generating the category corresponding to the folder, determining the network address included in the folder as the network address associated with the category, and storing the network address in the personalized search database.

BRIEF DESCRIPTION OF DRAWINGS

FIGS. 8 and 9 are diagrams illustrating an example of an updated search cookie according to an embodiment of the present invention;

FIG. 10 is a diagram illustrating an example of a search cookie including invalidation information according to an embodiment of the present invention;

FIG. 16 is a diagram illustrating information registered in a personalized search database of a personalized search system according to the present invention;

BEST MODE FOR CARRYING OUT THE INVENTION

Figure 1:
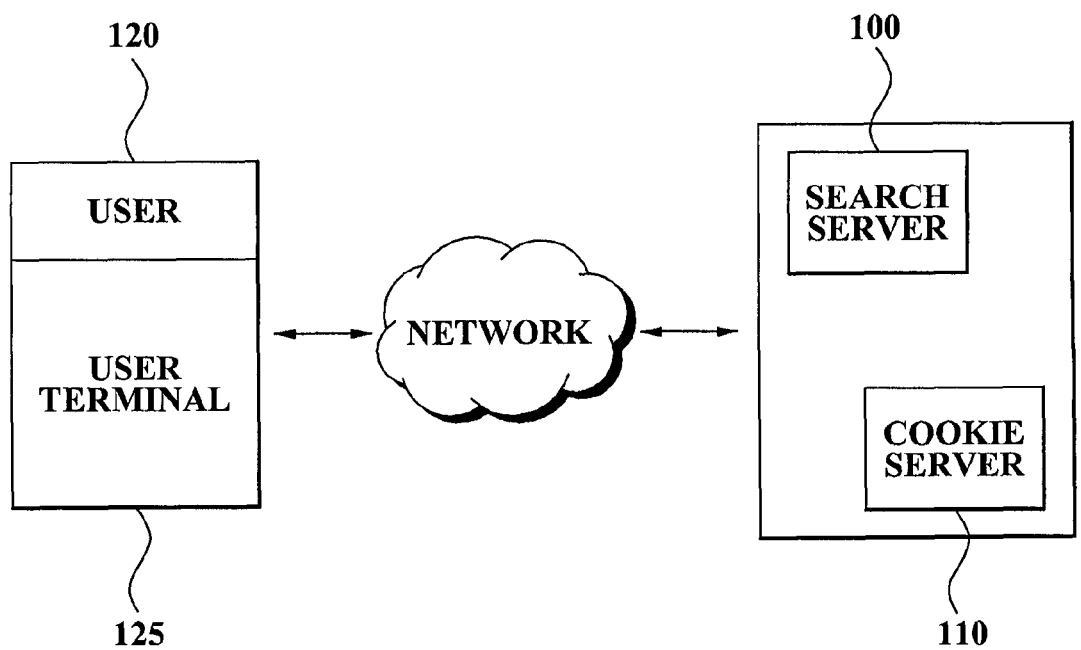
FIG. 1 is a diagram illustrating a personalized search system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a schematic diagram illustrating a personalized search system according to an embodiment of the present invention.

When a query and cookie information is received from a user terminal 125, a search server 100 generates a personalized search result list, based on a Uniform Resource Locator (URL) of each search cookie included in the cookie information. Also, the search server 100 generates a search result list which is commonly provided to users according to an existing searching method, such as a keyword searching method and a category searching method. The search server 100 provides a user 120 with the personalized search result list and the search result list according to different providing methods.

When the user 120 selects a search result from each of the personalized search result list and the search result list, a cookie server 110 may receive information associated with the selected search result from the user terminal 125 and update cookie information which is stored in the user terminal 125.

In this instance, the search server 100 and the cookie server 110 may be embodied as a single server and also embodied as different servers.

The user terminal 125 includes a communication terminal which can access a wired/wireless communication network by including a memory and a microprocessor, such as a desktop personal computer (PC), a notebook PC, a personal digital assistant (PDA), a portable device, etc.

Figure 2:
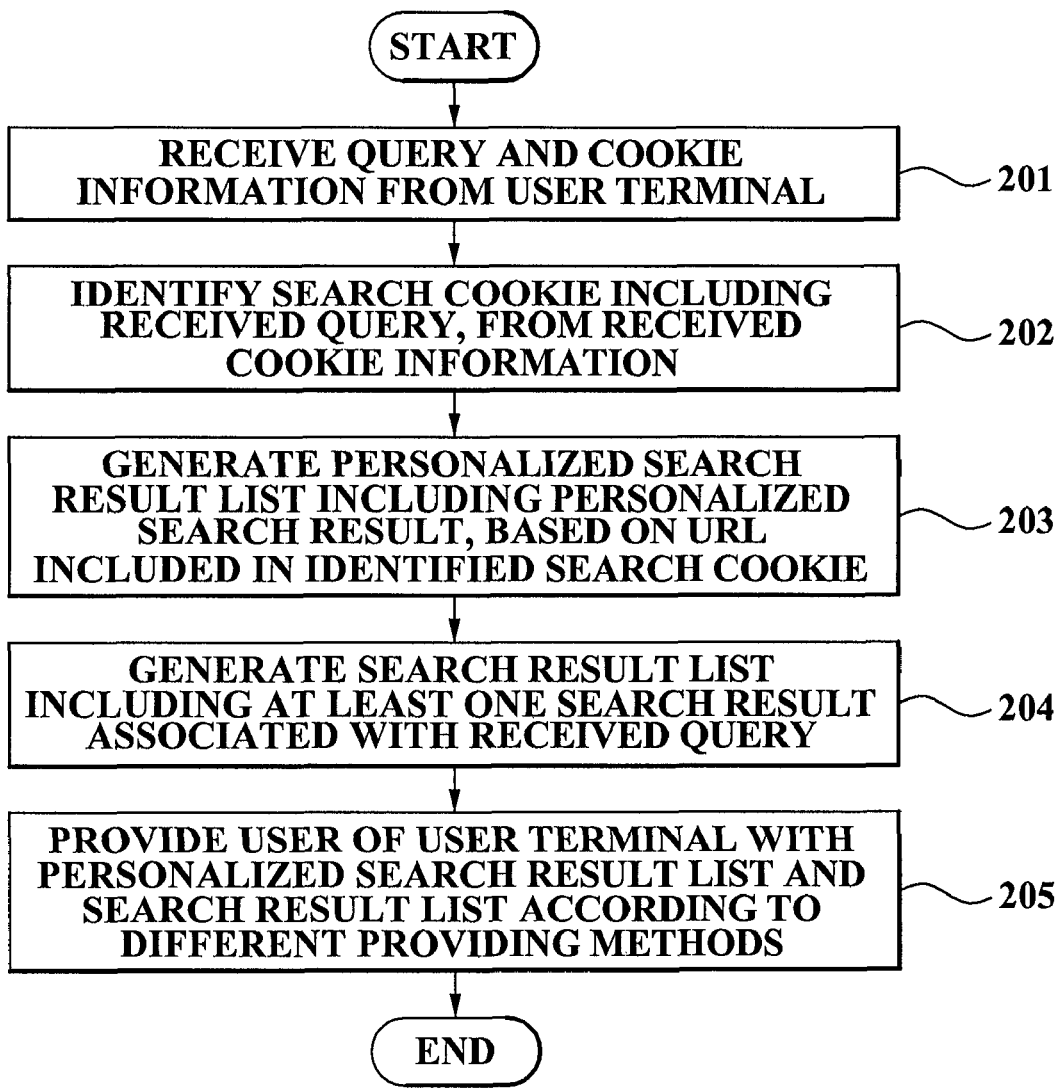
FIG. 2 is a flowchart illustrating a personalized search method according to an embodiment of the present invention.

FIG. 2 is a flowchart illustrating a personalized search method according to an embodiment of the present invention. The personalized search method according to the present invention may be performed by the search server 100.

In operation 201, the search server 100 receives a query and cookie information from the user terminal 125. In the present specification, the term "cookie information" indicates a group of at least one search cookie which is utilized for a personalized search according to the present invention. According to an embodiment of the present invention, the cookie information may include fewer search cookies than a predetermined number. Namely, when the user 120 inputs the query into the search server 100 via the user terminal 125 and requests a search, the search server 100 receives the query and the cookie information which are stored in the user terminal 125.

Also, each of the at least one search cookie includes any one of a query, a URL associated with the query, a number of selections associated with the URL, a selection point in time associated with the URL and an updating point in time of the search cookie.

1) The query may be inputted by the user 120 or be a query which is generated by formatting the query inputted by the user 120. Removing whitespace within the query, and if in English, changing capital letters into small letter, and the like may be utilized for the formatting.

2) The URL associated with the query is the URL of a website corresponding to a search result with respect to the query.

3) The number of selections associated with the URL indicates a number of times that the user 120 who receives search results corresponding to the URL selects a search result. Namely, when the user 120 inputs a predetermined query in the search server 100, the search server 100 provides the user terminal 125 with search results corresponding to the query. When the user 120 selects a search result corresponding to a particular URL from the provided search results, the search cookie is updated so that the number of selection associated with the URL is increased by one.

4) The selection point in time associated with the URL indicates a most recent point in time when the user selected the search result corresponding to the URL.

5) The updating point in time of the search cookie indicates a point in time when the search cookie is updated. When the search cookie is initially generated, the updating point in time of the search cookie is identical to a generation point in time of the search cookie. When the user 120 selects the URL included in the search cookie and update the search cookie, the updating point in time may be identical to the selection point in time of selecting the URL.

The selection point in time and the updating point in time may be utilized for a criterion updating cookie information, which will be described later.

Figures 3, 4:
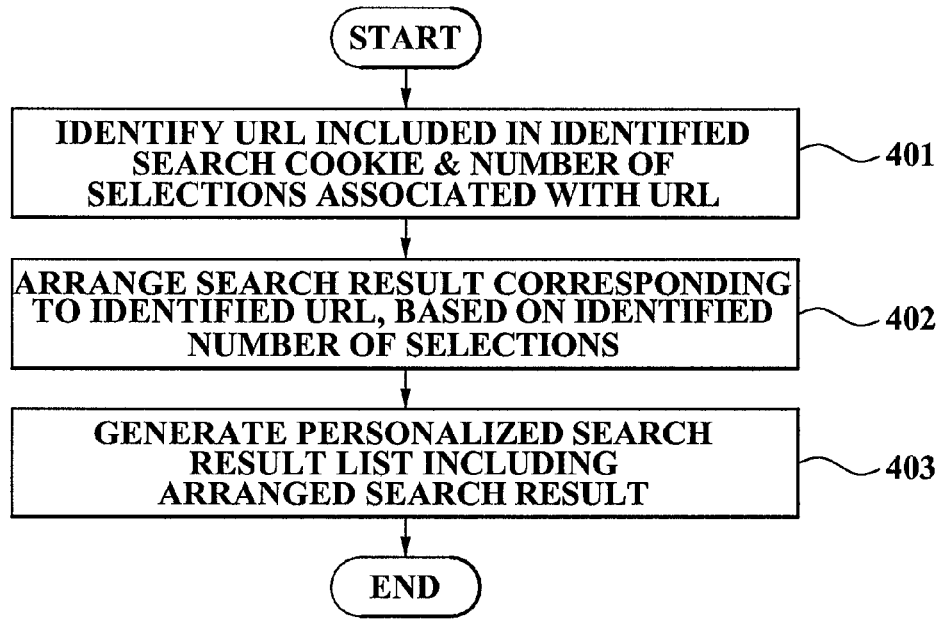
FIG. 3 is a diagram illustrating an example of a search cookie according to an embodiment of the present invention.
FIG. 4 is a flowchart illustrating a process of generating a personalized search result, according to an embodiment of the present invention.

FIG. 3 is a diagram illustrating an example of a search cookie according to an embodiment of the present invention. As described above, a search cookie includes a query, a URL associated with the query, and a number of selection associated with the URL. As shown in FIG. 3, the query of the search cookie is "flower delivery", the first URL thereof is "http://www.119flower.co.kr", the number of selections associated with the URL is 3, and a most recent selection point in time is Apr. 6, 2005.

In operation 202, the search server 100 identifies a search cookie including the received query, from the received cookie information. As an example, when the query received from the user terminal 125 is "flower deliver", the search server 100 may identify the search cookie whose query is "flower deliver", from the received cookie information.

In operation 203, the search server 100 generates a personalized search result list including at least one personalized search result, based on a URL included in the identified search cookie. The personalized search result list may be generated according to the user's number of selections on the URL included in the search result associated with the keyword.

Hereinafter, a method of generating a personalized search result will be described with reference to FIG. 4.

In operation 401, the search server 100 identifies the URL included in the identified search cookie and the number of selections associated with the URL. In operation 402, the search server 100 arranges the search result corresponding to the identified URL, based on the identified number of selections. As an example, the search result may be arranged in an order of a higher number of selections. When the identified number of selections of the URL is identical to the number of selections of a more recently used URL, the search result may be arranged by assigning a priority order to the more recently used URL, based on the identified selection point in time of the URL. In operation 403, the search server 100 generates the personalized search result list including the arranged search result.

Referring again to FIG. 3, for example, when the search cookie includes four URLs associated with the query "flower deliver" and the four URLs are arranged in an order of a higher number of selections, arrangement orders of "URL1 (3)" and "URL4(2)" which are more frequently used are determined. Also, when determining arrangement orders of "URL2" and "URL3" whose number of selections is identical as "1", a comparatively recently used URL, i.e. "URL2", may be thirdly arranged, based on information on a selection point in time. Namely, the four URLs may be arranged in an order of "URL1, URL4, URL2 and URL3". Accordingly, the search result corresponding to "URL1", the search result corresponding to "URL4", the search result corresponding to "URL2", and the search result corresponding to "URL3" may be sequentially arranged.

Also, according to another embodiment of the present invention, the search server 100 may arrange the search result by referring to the selection point in time included in the search cookie. Namely, the search server 100 may arrange search results corresponding to URLs included in the identified search cookie in an order of a selection point in time nearer to a current point in time.

Also, the search server 100 may arrange the search results by utilizing another criterion in addition to the number of selections or the selection point in time. As an example, when a URL associated with particular information is included in URLs included in the search cookie, the search server 100 may dispose the search result corresponding to the URL in a highest rank. In this instance, the particular information is for assigning a highest priority order to the URL associated with the particular information. The particular information may be assigned by the search server 100 or the cookie server 110. The cookie server 110 will be described later.

In operation 204, the search server 100 generates a search result list including at least one search result associated with the received query. In this instance, the search result list is commonly provided to all users, which is different from the personalized search result list reflecting each user's preference. The search result list may be generated according to a keyword searching method or a category searching method. Each of the at least one search result included in the search result list may be arranged in an order of its bidding price (keyword advertising server) or may be arranged in an order of its accuracy or registration date.

In operation 205, the search server 100 provides the user 120 of the user terminal 125 with the personalized search result list and the search result list according to different providing methods.

The different providing methods may include 1) arranging the personalized search result list in a higher rank than the search result list on a search screen, and 2) indicating the personalized search result list in a different form from the search result list on the search screen, e.g. in a different font type, with an underline, etc.

Figure 5:
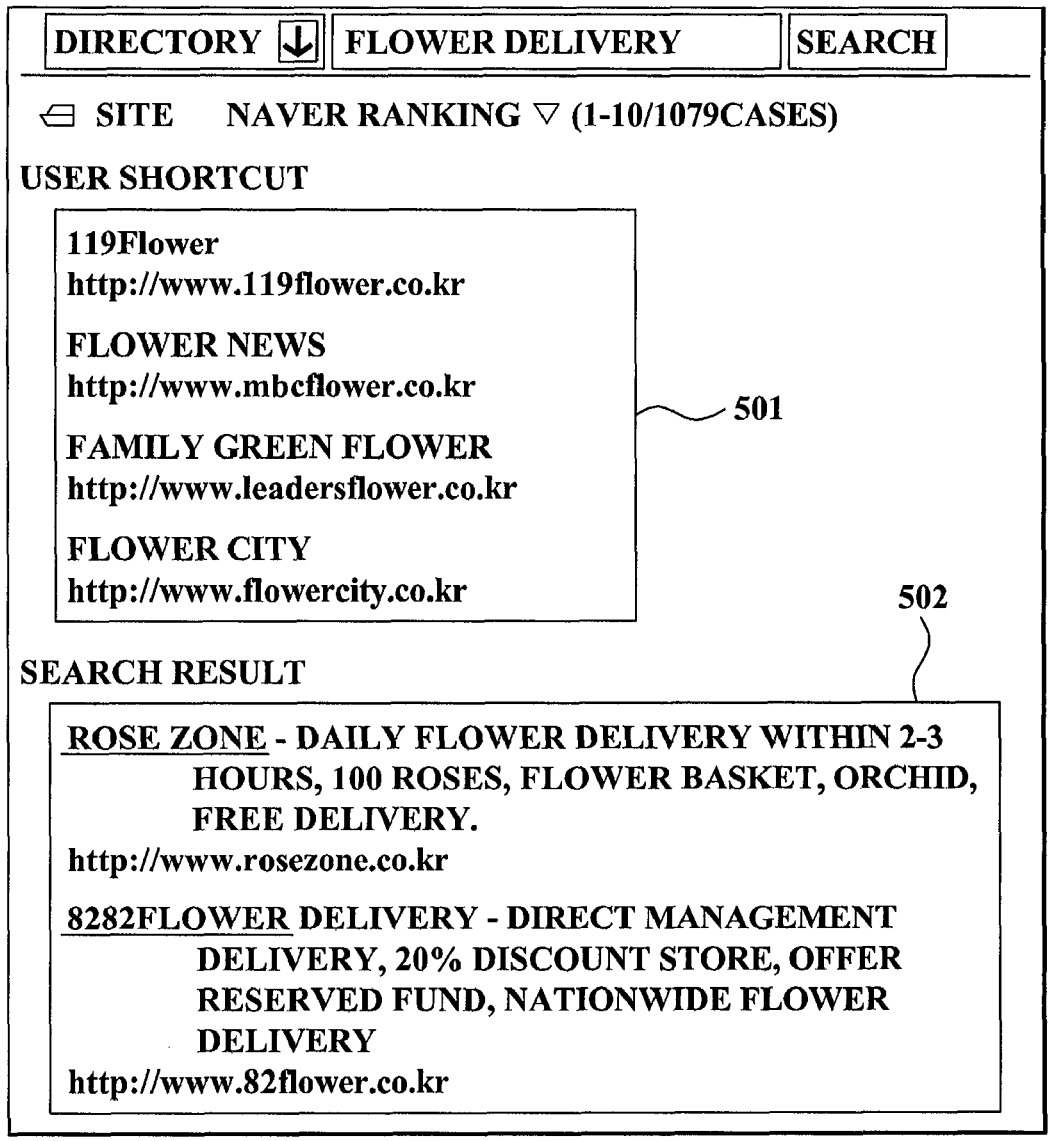
FIG. 5 is a diagram illustrating an example of a screen displaying a personalized search result list and a search result list on a user terminal according to an embodiment of the present invention.

FIG. 5 is a diagram illustrating an example of a screen displaying a personalized search result list and a search result list on the user terminal 125 according to an embodiment of the present invention.

As shown in FIG. 5, the search result displayed on the user terminal 125 may include a personalized search result list 501 and a search result list 502. In FIG. 5, the personalized search result list 501 is indicated as "user shortcut". Search results included in the personalized search result list 501 are arranged in an order of "119Flower (http://www.119flower.co.kr), flower news (http://www.mbcflower.co.kr), family green flower (http://www.leadersflower.co.kr), and flower city (http://www.flowercity.co.kr)", in correspondence to the arrangement orders of "URL1, URL4, URL2, and URL3" in operation 203.

Also, when the user 120 selects any one of the search results included in the personalized search result list 501 and the search result list 502, the present invention further performs updating and storing cookie information stored in the user terminal 125 by including the URL corresponding to the selected search result and the query.

Figure 6:
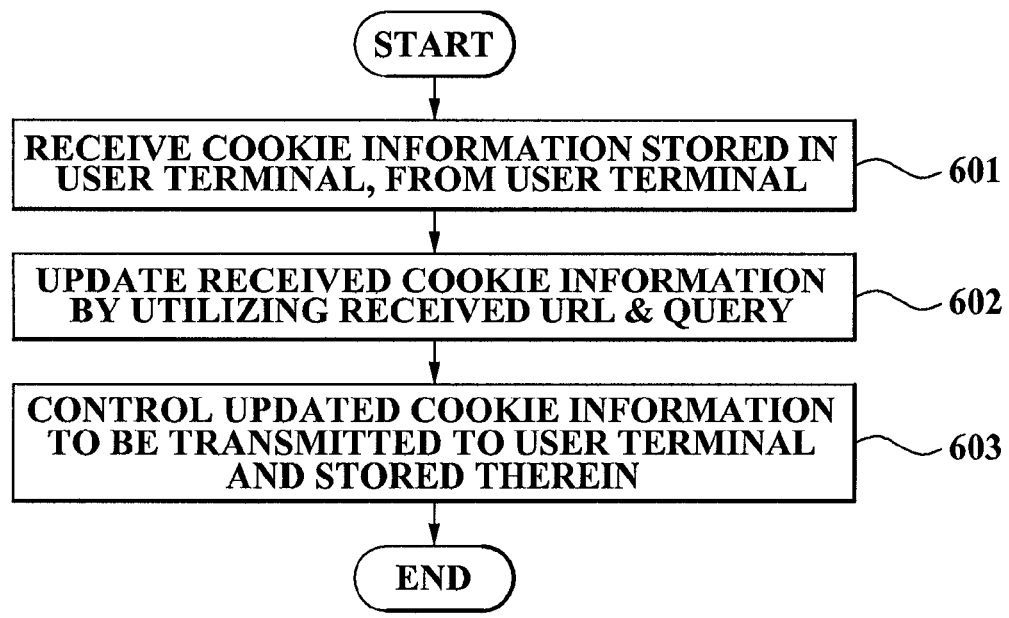
FIGS. 6 and 7 are flowcharts illustrating a process of updating cookie information according to an embodiment of the present invention.
Figure 7:
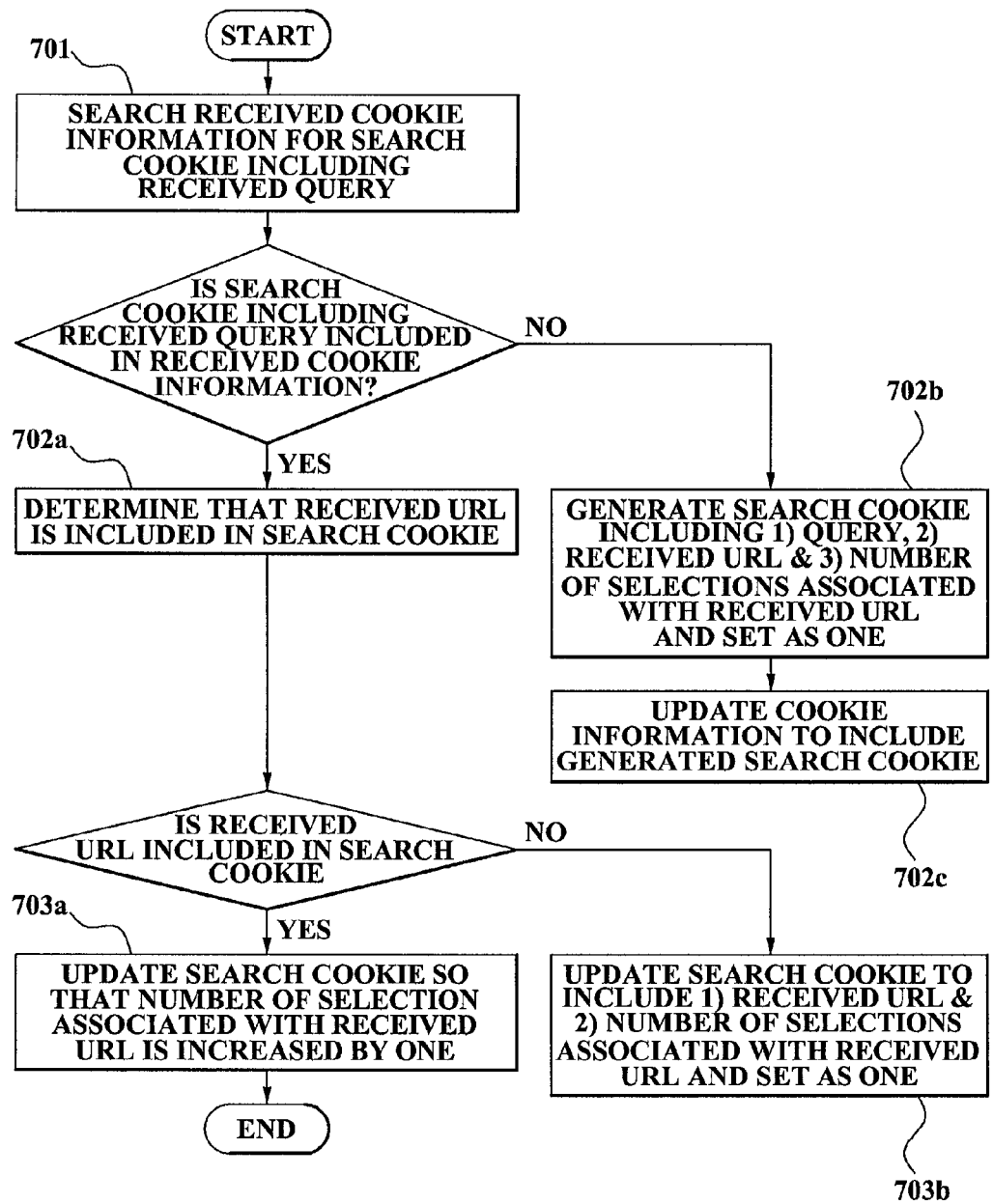

Hereinafter, a method of updating a search cookie will be described with reference to FIGS. 6 and 7. The search cookie may be updated by the cookie server 110 or the user terminal 125. An example of updating the search cookie in the cookie server 110 will be described. When the cookie server 110 functions to update the search cookie, a personalized search service according to the present invention may be provided without installing another program.

In operation 601, when the user 120 selects any one of search results included in the personalized search result list 501 or the search result list 502, the cookie server 110 receives 1) a URL corresponding to the selected search result, 2) a query associated with the search result, and 3) cookie information stored in the user terminal 125, from the user terminal 125.

Referring again to FIG. 5, as an example, when the user 120 selects "rosezone" from the search result list 502, the cookie server 110 may receive the URL, "http://www.rosezone.co.kr", corresponding to "rosezone", the query, "flower deliver", associated with the search result, and cookie information stored in the user terminal 125, from the user terminal 125.

In operation 602, the cookie server 110 updates the received cookie information by utilizing the received URL and the query. Operation 602 will be described in detail with reference to FIG. 7.

In operation 701, the cookie server 110 searches the received cookie information for the search cookie including the received query. Namely, the cookie server 110 may search the cookie information for the search cookie including the query "flower deliver".

In operation 702a, when the search cookie including the received query exists, the cookie server 110 determines whether the received URL is included in the search cookie. In operation 703a, when the received URL is included in the search cookie, the cookie server 110 updates the search cookie so that the number of selections associated with the received URL may be increased by one.

As an example, when the search cookie including query "flower deliver" and URL "http://www.rosezone.co.kr" is included in the cookie information which is received from the user terminal 125, the cookie server 110 updates the search cookie so that the number of selections associated with the URL may be increased by one. Also, the cookie server 110 may update the search cookie by changing the selection point in time associated with the URL into a current point in time.

In operation 703b, when the received URL is not included in the search cookie, the cookie server 110 updates the search cookie to further include 1) the received URL, 2) the number of selections, 1, and 3) the current point in time as the selection point in time. Accordingly, the search cookie of FIG. 3 is updated as shown in FIG. 8. It can be seen that data indicated by reference number 801 was added. When the search cookie is updated as described above, the updating point in time of the search cookie is also updated. In this case, the updating point in time is the current point in time which is the same as the selection point in time.

According to another embodiment of the present invention, a predetermined number of URLs, which may be included in the search cookie, may be restricted by 5. In the present invention, RFC2109 is a proposed standard with respect to cookies included in a Hypertext Transfer Protocol (HTTP) header, and transmitted/received is a single cookie and may support an amount of data of at least 4096 Kbytes. Developers of the present invention found that an optimum number of URLs to be included in a single search cookie is 5, so as to include a single query, a plurality of "URLs-number of selections-selection points in time-updating points in time" in the single search cookie. In this instance, 5 is only an example, and the present invention is not limited thereto. Namely, the number of URLs included in the single search cookie may be changed by adding/subtracting various kinds of data included in the search cookie or by changing a processing method of each data.

When the number of URLs included in the single search cookie is restricted to five, and less than five URLs are included in the single search cookie including the query "flower deliver" but not including the URL "http://www.rosezone.co.kr", the cookie server 110 may perform operation 703b. However, when five URLs are already included in the search cookie, the cookie server 110 may delete any one of the five URLs (and through this, delete the number of selections and the selection point in time associated with the deleted URL), and register an additionally received URL from the user terminal 125.

The cookie server 110 according to the present invention may selectively adopt rules below so as to select a URL to be deleted from the five URLs.

1) Least Recently Used (LRU) algorithm

The cookie server 110 may select a URL corresponding to a least recently used search result by a user from the five URLs, and delete the selected URL. Namely, the cookie server 110 deletes the URL whose selection point in time is least recent among the five URLs. In this instance, when deleting the selected URL according to the LRU algorithm, the number of selections and the selection point in time associated with the URL must also be deleted. After deleting corresponding data, the cookie server 110 updates the search cookie by including the additionally received URL from the user terminal 125, 1, and the current point in time as the number of selections, and the selection point in time associated with the additionally received URL respectively, in the search cookie.

2) Frequency Based Replacement (FBR) Algorithm

The cookie server 110 may select a URL corresponding to a least frequently used search result by the user from the five URLs, and delete the selected URL. Namely, the cookie server 110 deletes the URL whose number of selections is smallest among the five URLs. In this instance, when deleting the selected URL according to the FBR algorithm, the number of selections and the selection point in time associated with the URL must be also deleted. After deleting corresponding data, the cookie server 110 updates the search cookie by including the additionally received URL from the user terminal 125, 1, and the current point in time as the number of selections, and the selection point in time associated with the additionally received URL respectively, in the search cookie.

When the search cookie including the received query does not exist in operation 701, the cookie server 110 generates the search cookie including 1) the query, 2) the received URL, and 3) the number of selections which is associated with the received URL and set as 1, in operation 702b. Also, in operation 702c, the cookie server 110 updates the cookie information to include the generated search cookie.

As an example, when the search cookie including the received query "flower deliver" is not included in the received cookie information from the user terminal 125, the cookie server 110 updates the cookie information by generating the search cookie as shown in FIG. 9, and including the generated search cookie in the cookie information.

In the meantime, RFC2019 recommends that web browsers should store at least 20 cookies for each domain. In actuality, most web browsers utilized by a large number of users are embodied to be capable of storing only 20 cookies for each domain. Accordingly, in another embodiment of the present invention, the cookie server 110 may control less than 20 search cookies to be included in the cookie information. In this case, only when the number of search cookies already included in the cookie information is less than 20, does the cookie server 110 performs operation 702c.

When less than 20 search cookies are already included in the cookie information, the cookie sever 110 must delete any one of the 20 search cookies included in the cookie information, before including the additionally generated search cookie in the cookie information in operation 702b. According to an embodiment of the present invention, the search cookie 110 may delete a least recently updated search cookie from the search cookies included in the cookie information and include the additionally generated search cookie in the cookie information. Also, according to another embodiment of the present invention, the cookie server 110 may arbitrarily delete any one of the 20 search cookies included in the cookie information. Also, the cookie server 110 may delete the search cookie including invalidation information from the 20 search cookies included in the cookie information. In addition, various types of standards for selecting a search cookie to be deleted may be utilized.

According to another embodiment of the present invention, when updating cookie information, the cookie server 110 includes invalidation information with respect to predetermined at least a predetermined number of search cookies whose number of selections is less than a predetermined value, among search cookies included in the updated cookie information. As an example, an operator of the cookie server 110 may set the predetermined value as 2 and the predetermined number of URLs as 4.

FIG. 10 is a diagram illustrating an example of a search cookie including invalidation information according to an embodiment of the present invention. Referring to the search cookie shown in FIG. 10, there are five search cookies whose number of selection is less than 2. Accordingly, invalidation information indicated by reference number 1001 is included in the search cookie.

When generating the personalized search result list in operation 203, the search server 100 does not reflect the search cookie including invalidation information, in the personalized search result list, although the search cookie includes the query inputted by the user 120.

As shown in FIG. 10, a user inputted a query "Jejudo tour" into the search server 100 on Jan. 3, 2005, and also requested a search. Also, the user has accessed a corresponding website by selecting each search result provided from the search server 100. In this case, although the user selected and read a large number of search results, the user did not find the user's desired search result. Accordingly, when providing the search results as personalized search results, less preferred search results among users may be provided. Accordingly, according to the present invention, since the search cookie including invalidation information is not reflected when generating the personalized search result list, user preferences may be more accurately reflected.

Also, when the user repeatedly selects URL1, "http://www.egaya.co.kr", and URL5, "http://wwwjdtour.co.kr", and, as a result, the number of selections is at least two respectively, the cookie server 110 removes the invalidation information, so that the search cookie may be reflected again in the personalized search result.

In operation 603, the cookie server 100 transmits the updated cookie information by utilizing the updated or the generated search cookie to the user terminal 125. As described above in FIG. 2, the user terminal 125 stores the cookie information and also transmits the cookie information when the user 120 transmits the query to the search server 100. Also, the user terminal 125 is utilized when the cookie information generates the personalized search result list.

According to the configuration described above, the search server 100 may preferentially provide the search result which the user has selected in association with a corresponding query, as the personalized search result. Also, when providing the personalized search result list arranged according to the number of selections on the search result, user preferences may be further reflected. Also, a search cookie to be deleted or a URL to be deleted from search cookies is determined, based on an updating point in time of the search cookie or a most recent selection point in time of the search result. Accordingly, a change in the user preferences over a time may be reflected.

In the above-described embodiment, it is described that cookie information is updated in the cookie server 110, but the present invention is not limited thereto. According to embodiments, the user terminal 125 may update the cookie information. Namely, when the user 120 selects any one of search results from the personalized search result list or the search result list provided by the search server 100 with respect to the query inputted by the user 120, the user terminal 125 updates and stores cookie information stored in the user terminal 125 by utilizing the URL corresponding to the selected search result and the query.

Hereinafter, a personalized search system 1100 according to the present invention will be described with reference to FIG. 11. The personalized search system 1100 includes a search server 1100a and a cookie server 1100b according to each function. In this instance, the search server 1100a and the cookie server 1100b may be embodied in a single server or different servers.

The search server 1100a includes a receiving unit 1101, an identification unit 1102, a search database 1103, a search result list generation unit 1104 and a search result list providing unit 1105.

The receiving unit 1101 receives a query and cookie information from a user terminal. The cookie information includes at least one search cookie, and each of the at least one search cookie includes a query, a URL associated with the query, and a number of selections associated with the URL. Also, the number of selections is a number of times that the user of the user terminal selects the search result corresponding to the URL.

The identification unit 1102 identifies a search cookie including the received query from the received cookie information.

The search result list generation unit 1104 generates a personalized search result list including at least one personalized search result, based on URLs included in the identified search cookie. In this case, the search result list generation unit 1104 may generate the personalized search result list by identifying the number of selections associated with each of the URLs included in the identified search cookie and arranging the search result corresponding to each of the URLs in an order of a higher number of selections.

Also, the search result list generation unit 1104 generates a search result list by utilizing a keyword searching method or a category searching method with reference to the search database 1103. In this instance, the search result list is commonly provided to a large number of users.

The search result list providing unit 1105 provides the user of the user terminal with the personalized search result list and the search result list according to different providing methods.

Figure 11:
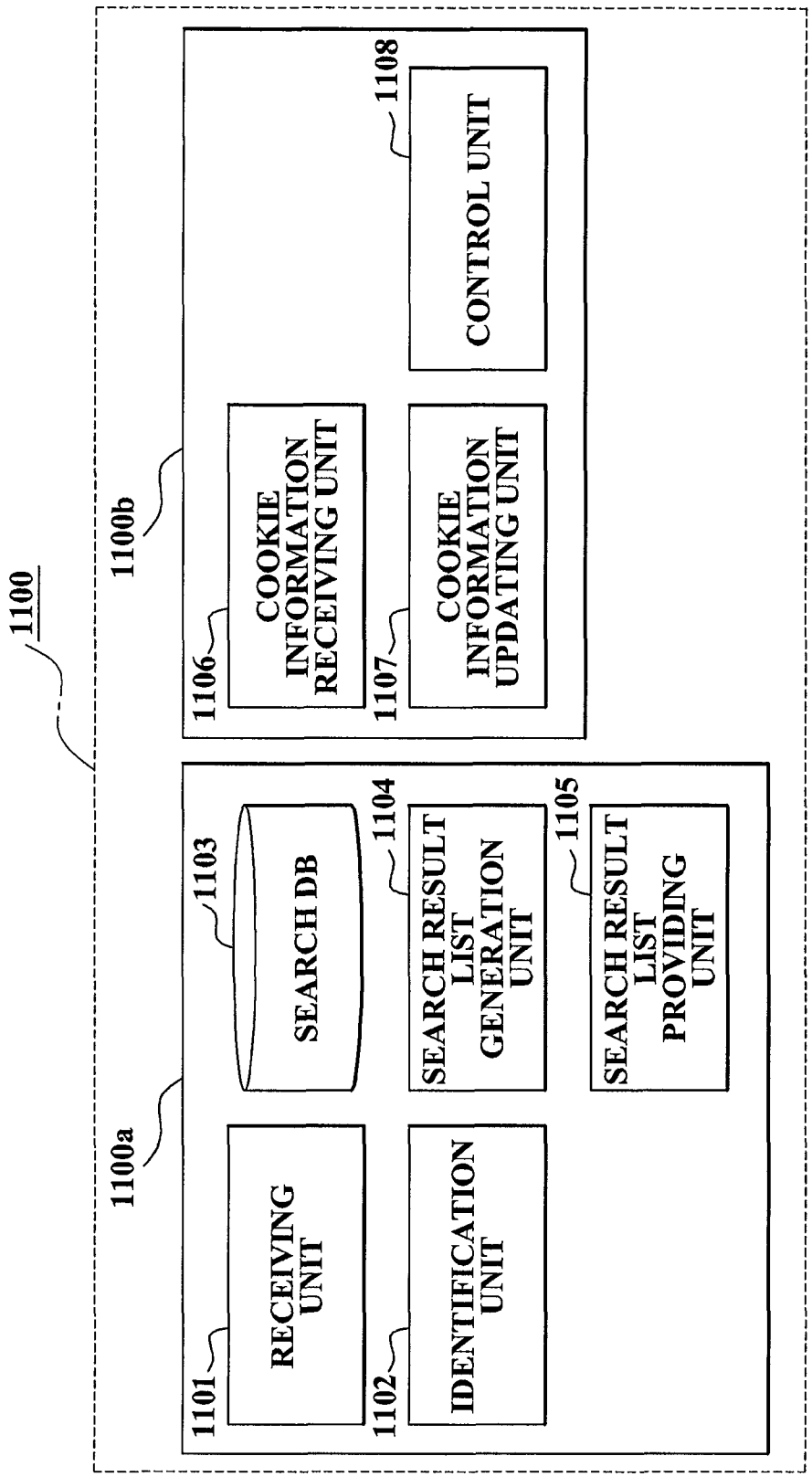
FIG. 11 is a block diagram illustrating a personalized search system according to an embodiment of the present invention.

As shown in FIG. 11, the cookie server 1100b includes a cookie information receiving unit 1106, a cookie information updating unit 1107, and a control unit 1108.

When the user selects the search result included in the personalized search result list or the search result list, the cookie information receiving unit 1106 receives 1) a URL corresponding to the selected search result, 2) the query associated with the selected search result, and 3) cookie information stored in the user terminal, from the user terminal.

The cookie information updating unit 1107 updates the received cookie information by including the received URL and the query. Since an updating criterion of the cookie information has been described in the above-described embodiment, further detailed description related thereto will be omitted in the present embodiment.

The control unit 1108 transmits the updated cookie information to the user terminal. The user terminal changes the previously stored cookie information with the transmitted cookie information.

Hereinafter, a personalized search method and a personalized search system utilizing favorites of a web browser will be described.

Figure 12:
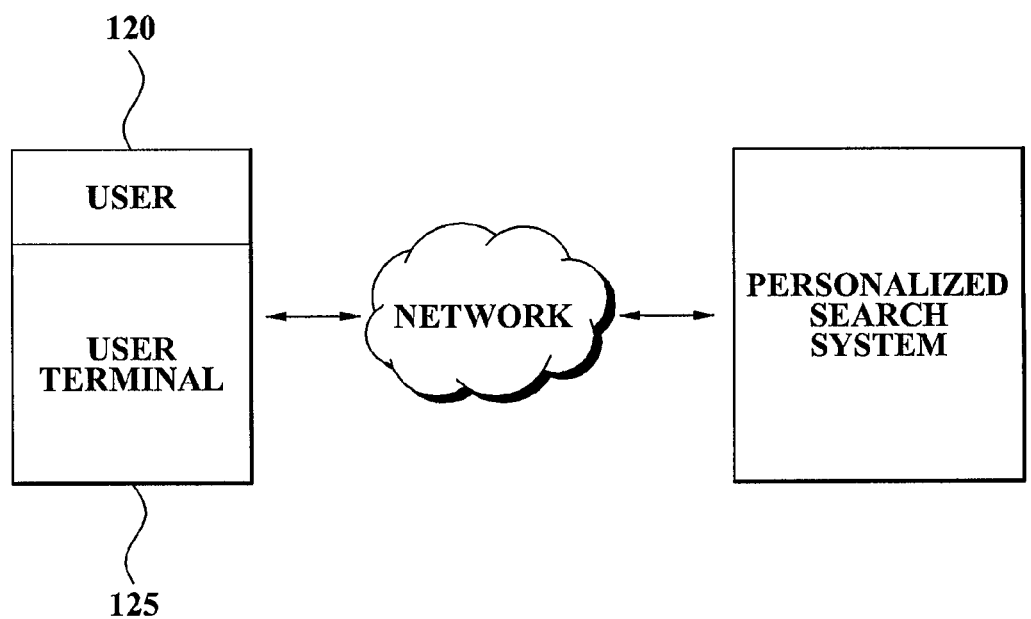
FIG. 12 is a diagram illustrating a network connection of a personalized search system according to another embodiment of the present invention.
Figure 13:
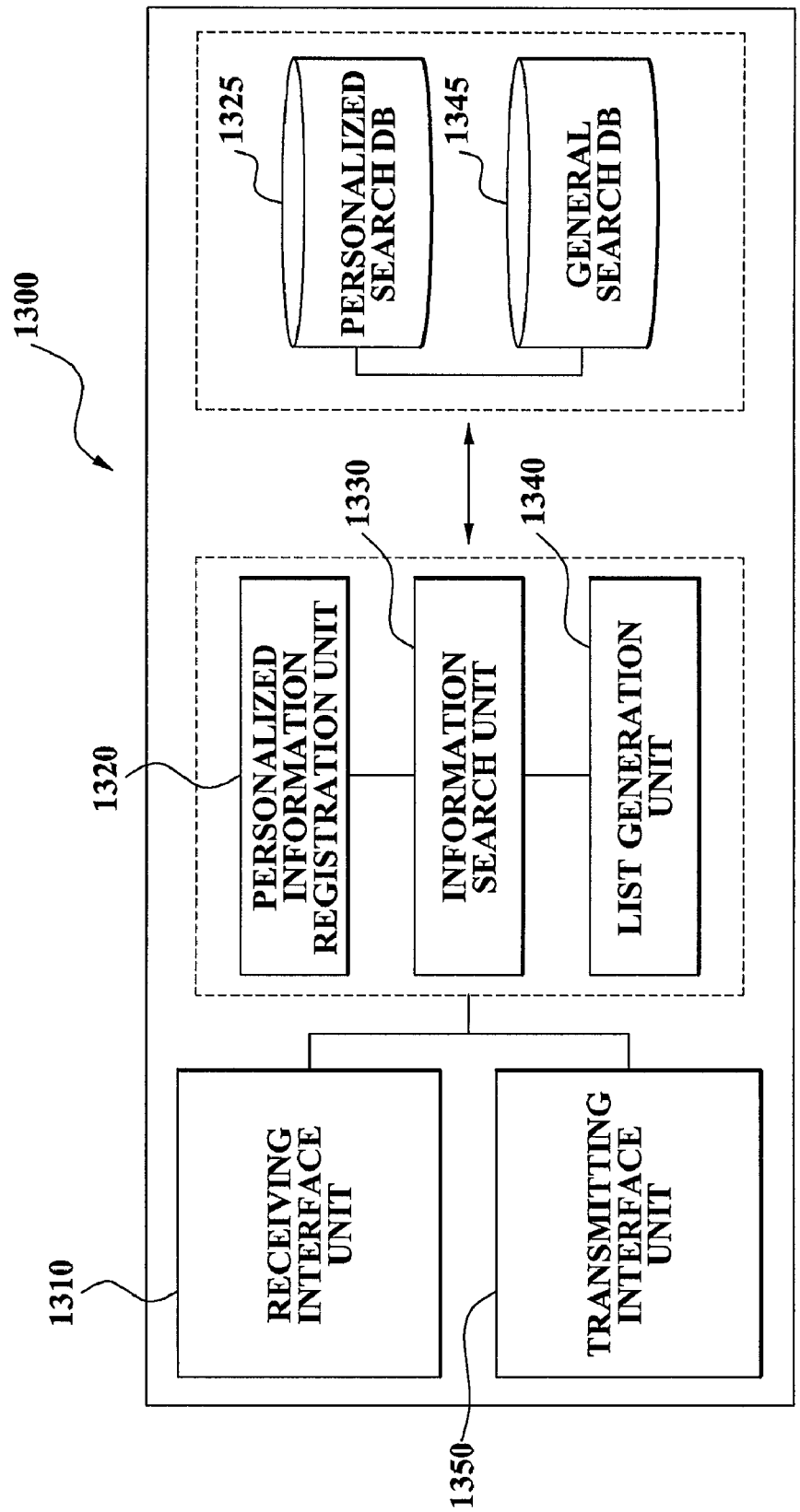
FIG. 13 is a block diagram illustrating an internal configuration of a personalized search system according to another embodiment of the present invention.
Figure 14:
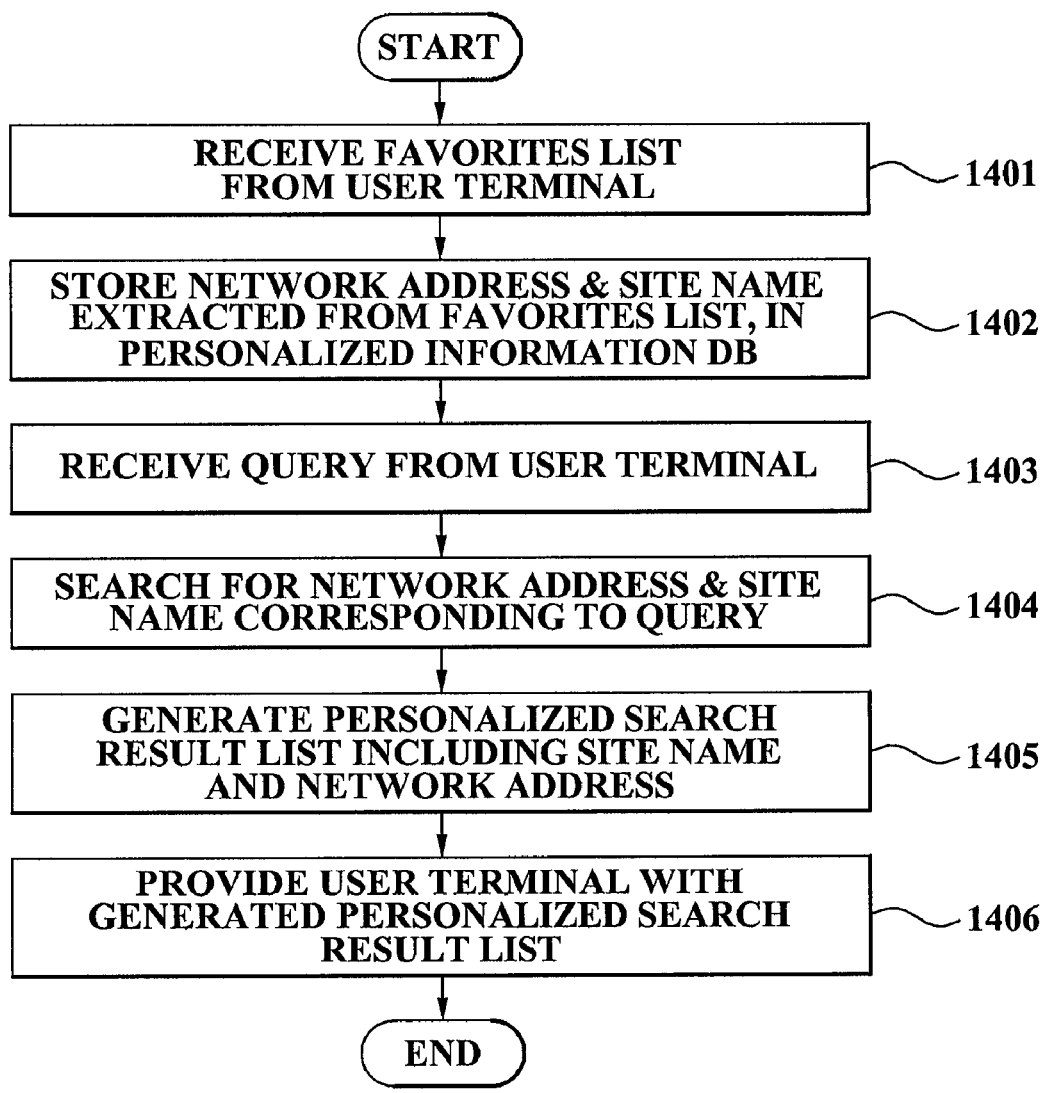
FIG. 14 is a flowchart illustrating a personalized search method according to still another embodiment of the present invention.

FIG. 12 is a diagram illustrating a network connection of a personalized search system according to another embodiment of the present invention, and FIG. 13 is a block diagram illustrating an internal configuration of a personalized search system according to another embodiment of the present invention. A personalized search system 1300 includes a receiving interface unit 1310, a personalized information registration unit 1320, an information search unit 1330, a list generation unit 1340, and a transmitting interface unit 1350. Also, FIG. 14 is a flowchart illustrating a personalized search method performed in the personalized search system 1300. Hereinafter, the personalized search method in the personalized search system 1300 will be described with reference to FIGS. 12 through 14.

In operation 1401, the receiving interface unit 1310 receives a favorites list including a site name and a network address corresponding to the site name, from the user terminal 125. In this instance, the favorites list is saved in a web browser installed in the user terminal 125 by the user 120. When the favorites list is in a hierarchical structure utilizing a folder and a subfolder, the receiving interface unit 1310 also receives information on the hierarchical structure. In the present embodiment, it is described that the favorites list is directly received from the user terminal 125, but it is only an example. Various methods of receiving the favorites list, such as a method of transmitting a control program, e.g. Active-X, JavaScript, etc., to the user terminal 125 in a predetermined server, and receiving the favorites list from the user terminal 125 utilizing the control program may be utilized.

The receiving interface unit 1310 may receive a current favorites list of the user terminal 125, 1) when the user terminal 125 initially accesses the personalized search system 1300, 2) when the user 120 bookmarks an additional network address (or a site name corresponding to the network address) to the favorites list, and thereby, the favorites list set in the web browser is updated, 3) at predetermined periods, or 4) when a predetermined event occurs, e.g. when receiving a request for updating the user's favorites list from the user terminal 125.

Figure 15:
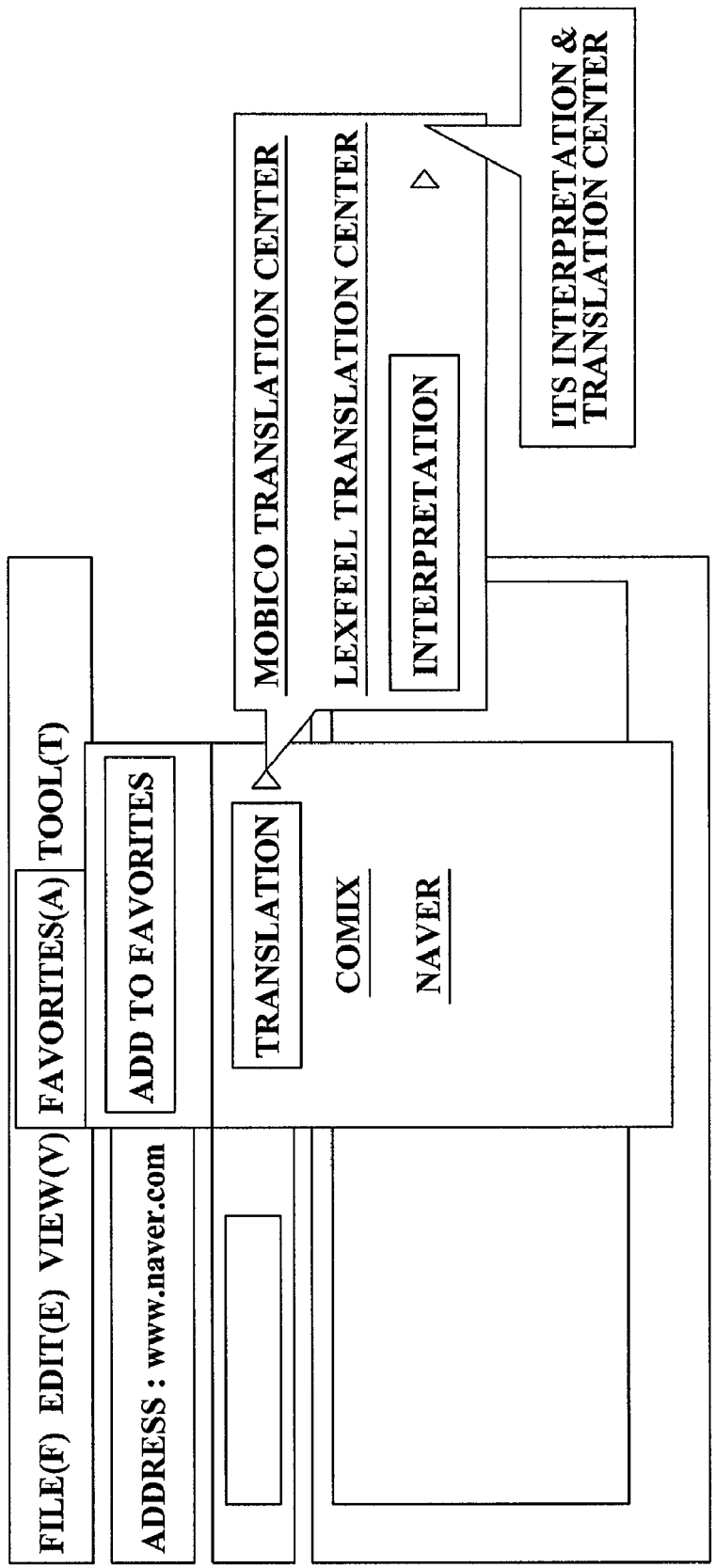
FIG. 15 is a diagram illustrating an example of a favorites list installed in a web browser of a user terminal.

Hereinafter, the favorites list received by the receiving interface unit 1310 will be described in detail with reference to FIG. 15. FIG. 15 is a diagram illustrating an example of a favorites list installed in a web browser.

When the user 120 bookmarks a particular website to a favorites list by utilizing a favorites function of a web browser installed in the user terminal 125, the web browser adds a network address of the website to a predetermined file and manages the added network address. Since a site name indicating the website is displayed on a menu, favorites list A of the web browser, the user 120 may easily move to the website by only clicking the site name. The site name may utilize a name designated by an operator of the website, a title designated to the website, or a character string directly inputted by the user 120.

Also, the user 120 may manage the favorites list utilizing a folder. As an example, in FIG. 15, three websites (whose site names are 'mobico translation center', "LEXFEEL translation center', and 'ITS interpretation & translation center', respectively) are registered in a folder of 'translation'. Also, the folder of translation' further includes a subfolder of 'interpretation'. Also, one website (whose site name is 'ITS interpretation & translation center') is registered in the subfolder of 'interpretation'. As described above, the user 120 may systematically manage the favorites list using the folder.

Accordingly, the favorites list is received by the receiving interface unit 1310 and includes information with respect to a site name, a network address corresponding to the site name, a folder including the site name, a higher order folder including the folder, and a subfolder including the folder.

In operation 1402, the personalized information registration unit 1320 stores and registers information included in the received favorites list in a personalized search database 1325, in association with the user terminal 125. In particular, the personalized information registration unit 1320 may save the site name/network address for each category by reflecting the hierarchical structure of the favorites list and generating a category corresponding to the folder. In this instance, the personalized information registration unit 1320 constructs the personalized search database 1325, so that a relation of category>>subcategory may be understood by reflecting a relation of folder>>subfolder.

FIG. 16 is a diagram illustrating information registered in the personalized search database 1325 in association with the user terminal 125 according to the present invention. As shown in FIG. 16, the personalized search database 1325 includes a category corresponding to a folder, a network address with respect to each website included in the category, and a site name associated with the network address. As indicated by reference number 1601, the website whose folder is not designated by the user 120 is stored in the personalized search database 1325, while a category of the website is not designated.

When a search request including the query is received from the user terminal 125 in operation 1403, the information search unit 1330 searches the personalized search database 1325 for information corresponding to the search request by utilizing a keyword searching method or a category searching method in operation 1404. As an example, when the user 120 inputs a query, 'comix', and requests a search, the information search unit 1330 may search the personalized search database 1325 for a network address 'www.ecomix.co.kr' whose site name is 'comix', by utilizing the keyword searching method.

Also, when the user 120 inputs a query, 'translation', and requests a search, the information search unit 1330 may search the personalized search database 1325 for 'www.mobico.com', and 'www.lexfee.com' whose site names include 'translation', by utilizing the keyword searching method. Also, the information search unit 1330 may search the personalized search database 1325 for 'www.mobico.com', 'www.lexfeel.com' and 'www.it81.com', which are included in the category of 'translation', by utilizing the category searching method.

In operation 1405, the list generation unit 1340 generates a search result including the retrieved network address by the information search unit 1330 and generates a personalized search result list including the generated search result generated by the list generation unit 1340. Namely, the list generation unit 1340 generates the search result including the retrieved network address, a site name associated with the retrieved network address, and a category associated with the retrieved network address, and generates the personalized search result list by arranging the search result according to a predetermined algorithm. Also, the search result for each network address may be previously generated and stored in the personalized search database 1325.

In operation 1406, the transmitting interface unit 1350 provides the user terminal 125 with the generated search result list. Namely, the transmitting interface unit 1350 provides the personalized search result list to the user 120 who inputted the query, in response to the search request. Also, the transmitting interface unit 1350 displays the personalized search result on a predetermined region of a search screen.

A process of generating a personalized search result list utilizing a favorites list and providing the generated personalized search result list has been described. Also, the personalized search system 1300 provides the user 120 with a general search result list in addition to the personalized search result list.

Unlike the personalized search result list, the generated search result list is commonly provided to a plurality of users with respect to one query, and may be generated by a conventional search method. Also, according to the present invention, the generated search result list may be generated by statistically analyzing information included in favorites lists which are received from each of the user terminals 125, which will be described later with reference to FIG. 17.

Figures 17, 18:
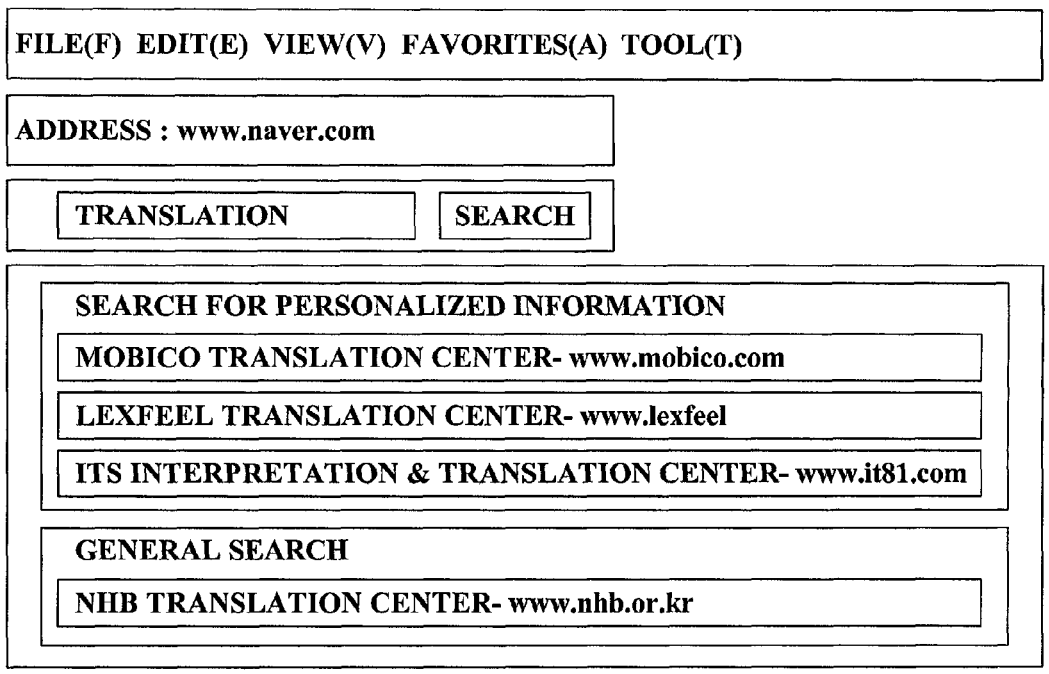
FIG. 17 is a diagram illustrating an example of displaying a personalized search result list and a general search result list according to the present invention.
FIG. 18 is a diagram illustrating information registered in a general search database of a personalized search system according to an embodiment of the present invention.

FIG. 17 is a diagram illustrating an example of displaying a personalized search result list and a general search result list according to the present invention. In FIG. 17, the search screen is divided into a 'personalized information search' region for displaying the personalized search result list and a 'general search' region for displaying the general search result list.

Namely, according to the present invention, search results with respect to both a website in which the user 120 is interested in to some degrees that the user 120 directly bookmarks the website in the favorites list, and a website found by the general search method may be provided to the user 120.

Hereinafter, a process of providing users with a general search result list according to the present invention will be described in detail with reference to FIG. 18.

The personalized search system 1300 analyzes information which is included in a favorites list saved for each user terminal 125, and generates/updates a general search database 1345 based on the analyzed information.

The general search database 1345 includes a search record for each network address. The search record includes the network address, a keyword, and a number of registrations. In this instance, the number of registrations indicates a number of times that users registered the website corresponding to the network address in the favorites list.

As an example, it is assumed that a user terminal A, a user terminal B, and a user terminal C have accessed the personalized search system 1300 and the favorites list installed in each of the user terminals A, B, and C is as shown below.

User terminal A: website 1, website 2, website 3
User terminal B: website 2, website 3
User terminal C: website 1, website 2, website 4

In this case, website 1 is stored two times, website 2 is stored three times, website 3 is stored two times, and website 4 is stored one time in the general search database 1345, respectively, as the number of registrations.

FIG. 18 is a diagram illustrating an example of the general search database 1345 generated according to the above process. As an example, a search record indicated by reference number 1801 shows that 14 user terminals which have accessed the personalized search system 1300 registered the website of the network address 'www.mobico.com' in their favorites list.

The number of registrations in the favorites list for each website may be utilized as a criterion for evaluating a popularity of a particular website. As an example, in the case of a website which is frequently registered in the favorites list, i.e. in the case of a website with a large number of registrations, it is possible to determine that the website receives interests and a large number of visits from users. Namely, it is possible that the website is very popular.

The list generation unit 1340 may generate the general search result list by referring to the general search database 1345, and assign a priority order to the more frequently registered website. As an example, when the user 120 inputs the query 'translation', the information search unit 1330 searches for network addresses, e.g. 'www.mobico.co.kr', 'www.lexfeel.com', and 'www.it81.com' by referring to the personalized search database 1325. Also, the information search unit 1330 searches for network addresses, 'www.kitc.co.kr', 'www.china1472.com', and 'www.it81.com', by referring to the general search database 1345.

As described above, the list generation unit 1340 generates the personalized search result list by utilizing the retrieved network addressed with reference to the personalized search database 1325. Also, the list generation unit 1340 generates the general search result list by utilizing the retrieved network addresses with reference to the general search database 1345. In this case, the network address with respect to the website included in the personalized search result list may be excluded from the general search result list, so as to prevent a repetition. Namely, the search result with respect to the website corresponding to the network address 'www.it81com' is not included in the search result list.

Also, the list generation unit 1340 may arrange the search result corresponding to the network address by utilizing the number of registrations associated with each network address. Namely, the search result with respect to the website corresponding to the more frequently registered network address 'www.kitc.co.kr' is displayed in a higher rank than the search result with respect to the website corresponding to the network address 'www.china1472.com', on the search screen.

As described with reference to FIG. 18, when an additional user terminal is connected to the personalized search system 1300, the general search database 1345 may be updated by utilizing the favorites list installed in the additional user terminal. Also, even in the case of a previously accessed user terminal, when the favorites list of the user terminal is changed, the general search result database 1345 may be updated by reflecting the change.

According to the configuration as above, the personalized search result list and the general personalized search result list reflecting users' preferences may be provided.

The embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, there is provided a personalized search service method and system which can provide a user with a personalized search service, even when user information is not stored in a search server and also, even when the user does not log in.

Also, according to the present invention, there is provided a personalized search method and system which can reflect an individual user's preference by generating cookie information including a query inputted from a user when requesting a search, a search result selected by the user from a search result list provided to the user in association with the query, and a number of times that the search result is selected with respect to the query, and by providing a personalized search service utilizing the cookie information.

Also, according to the present invention, there is provided a personalized search method and system which can provide a criterion for generating or updating the cookie information, so as to effectively manage the cookie information and more accurately reflect user preferences.

Also, according to the present invention, there is provided a personalized search service utilizing a favorites list which is registered to a web browser of a user terminal.

Also, according to the present invention, there is provided a search service in which each user's preference is reflected by statistically analyzing a favorites list received from each of a plurality of user terminals.

The invention claimed is:

1. A method for providing a personalized search service, the method comprising:
receiving a search query and cookie information from a user terminal without performing a user identification process by maintaining a limited number of the received cookie information, wherein the search query comprises a query keyword;
identifying at least one searched cookie information comprising a Uniform Resource Locator (URL) which corresponding to the query keyword, and selecting the identified cookie information, wherein the selected cookie information is determined by at least one of a number of times of selections, a selection point in time at which the most recent URL corresponding to the identified cookie information being selected by the user or any combinations thereof that are managed by a server;
concurrently generating a personalized search result and a general search result, wherein the personalized search result comprises identified cookie information list based upon the URL of the identified cookie information corresponding to the search query, and a general search result list comprises at least one general search result associated with the received query keyword; and
providing the user terminal with a personalized search result list by arranging the personalized search result list with higher rank than the general search result list.

2. The method of claim 1, wherein the searched cookie information comprises the query keyword, the URL associated with the query keyword, and a number of selections associated with the URL, wherein the number of selections comprises a number of times that the website associated with the URL is selected, and wherein concurrently generating of the personalized search result list and a general search result list comprises:
arranging the personalized search result list in a priority order based, at least in part, upon the number of selections and the most recently selected; and
generating the personalized search result list comprising the arranged search result.

3. The method of claim 1, wherein the at least one searched cookie information comprises the query keyword, the URL associated with the query keyword, and a selection point in time of the searched cookie information associated with the URL, wherein the selection point in time comprises a point in time when the most recent URL was selected, and wherein the generating of the personalized search result list comprises:
arranging the personalized search result list first based upon the selection point in time; and
generating the personalized search result list with a priority order when arranging the search result.

4. The method of claim 1, further comprising:
receiving, from the user terminal, a URL information corresponding to the personalized search result, and the searched cookie information being stored in the user terminal in response to selection of the search result associated with the personalized search result list or the general search result list;
updating the received cookie information based on the received URL information and the query; and
transmitting the updated cookie information to the user terminal.

5. The method of claim 4, further comprising:
updating the cookie information by decreasing a value of invalidation information which is additionally included by the number of selections, the number of selections of the invalidation information is less than the value, among search cookies included in the updated cookie information.

6. The method of claim 1, wherein the personalized search result list is displayed separately from the general search result list.

7. A method for providing a personalized search result, the method comprising:
receiving a keyword and a network address from a user terminal without performing a user identification by maintaining a limited number of the received network address;
searching a network address corresponding to the keyword from a search database comprising search record;
selecting at least one network address from the user terminal and the search database respectively, the selection using cookie information of the selected network address and the selection is determined by one of number of selections, a selection point in time at which the most recent network address corresponding to the cookie information, or any combinations thereof being selected by a user; and distinguishably generating a search result comprising the selected network address separately being selected from the user terminal and the search database and providing the personalized search result to user terminal with the generated search result.

8. The method of claim 7, wherein the search record comprises:
the keyword;
at least one network address associated with the keyword; and
the number of registrations associated with the at least one network address,
wherein the number of registrations comprise a number of times that a site corresponding to the network address is registered as a favorite in any of a plurality of favorites lists set in a plurality of web browsers installed in each of a plurality of user terminals.

9. The method of claim 7, wherein providing the personalized search result comprises arranging by a prioritization of the search result, based on the number of registrations associated with the selected network address.

10. The method of claim 7, further comprising:
receiving a favorite list of selected network addresses from the user terminal, the favorite list being set in a web browser installed in the user terminal, the favorite list comprising network addresses;
determining an additionally registered network address from the network addresses included in the favorites list;
searching the search database for a search record associated with the additionally registered network address; and
increasing a value associated with the number of registrations included in the search record associated with the additionally registered network address.

11. A personalized search system, comprising:
receiving unit to receive a search query and cookie information from a user terminal wherein the cookie information comprising Uniform Resource Locator (URL) information is received in response to receipt of the search query without receiving user identification data by maintaining a limited number of the cookie information;
an identification unit to identify at least one search cookie information corresponding to the search query, wherein the search cookie information is identified by one of a number of selection, a selection point in time at which the most recent URL corresponding to the cookie information being selected by the user or any combinations thereof associated with the search query, and
wherein a personalized search result and a general search result are concurrently generated associated with the Uniform Resource Locator (URL) information of the identified search cookie information corresponding to the personalized search result,
wherein the general search result comprises at least one general search result associated with the search query by utilizing any one of keyword searching and category searching by a search engine, and
the personalized search result list is provided with a higher priority than the general search result list.

12. The system of claim 11, further comprising:
a search result list generation unit configured to identify the URL information included in the identified search cookie information and a number of selections associated with the URL information to arrange the search result corresponding to the identified URL based on the identified number of selections, and to generate the personalized search result list along with the general search result.

13. The system of claim 11, further comprising a cookie server, the cookie server comprising:
a cookie information receiving unit to receive from the user terminal, in response to receipt of selection of a search result included in the personalized search result or the general search result, a URL corresponding to the selected search result, a query associated with the selected search result, and cookie information stored in the user terminal;
a cookie information updating unit to update the received cookie information based on the received URL information and the search query; and
a control unit to transmit the updated cookie information to the user terminal and to store the updated cookie information in the user terminal.

14. A personalized search system comprising:
a receiving interface unit to receive a favorites list of selected network addresses from the user terminal without receiving user log-in information, the favorites list being set in a web browser associated with cookie information installed in the user terminal, the favorites list comprising at least one network address and a site name corresponding to a query inputted by a user;
a personalized information registration unit to store the at least one network address and the site name in a search database in association with the receiving interface unit of the user terminal;
an information search unit to search the search database for a first site name comprising the query received from the user terminal and a first network address associated with cookie information corresponding to the first site name according to one of a number of times of selections, a selection point in time at which the most recent network address corresponding to the cookie information being selected by the user terminal or any combinations thereof;
a list generation unit to generate a personalized search result comprising a retrieved network address and a personalized search result list; and
a transmitting interface unit to provide the user terminal with the generated personalized search result list.

15. The system of claim 14, wherein
the personalized information registration unit is configured to generate a category corresponding to a folder, to determine a network address included in the folder as a network address associated with the category, and to store the network address associated with the category in the search database, the search database being provided for the user terminal, and wherein the information search unit is configured to search the personalized search database for a category associated with the query received from the user terminal and a network address associated with the category corresponding to the query.

16. A personalized search method, comprising:
receiving at least one network address and cookie information from a user's web browser of a user terminal associated with a query keyword inputted by a user when requesting a search, the network address being received without performing a user identification process, wherein the received network address is maintained with by a predetermined number;
storing the received network address in a search database;
receiving a search query from the user terminal wherein the search query comprises a query keyword;

searching the search database for selecting cookie information of network address associated with the query keyword, the selection is performed based on one of a number of times of selections, a selection point in time at which the most recent network address and the cookie information being selected by the user or any combinations thereof;

generating a personalized search result list by determining number of times the network address is selected, the search result comprising cookie information associated with the selected network address; and providing the user terminal with the generated personalized search result list.

17. The method of claim 16, wherein the stored network address is associated with a predetermined category, and wherein searching the search database further comprises:

searching the personalized search database for a category associated with the query keyword; and searching for a network address associated with the same category as is associated with the query keyword.

18. The method of claim 16, further comprising:

generating a general search result list comprising at least one general search result associated with the received query keyword, wherein the personalized search result list is displayed separately and prioritizing over the general search result list.

19. The method of claim 16, wherein receiving at least one network address from a user terminal comprises receiving a favorites list of selected network addresses from the user terminal, the favorites list being set in a web browser installed in the user terminal, the favorites list comprising the network addresses and associated names, and wherein storing the received network address comprises storing the network addresses and associated names in the search database in association with the user terminal.

20. The method of claim 19, wherein searching the search database comprises searching at least one name comprising the query keyword and the associated network address.

21. The method of claim 19, wherein the favorites list comprises at least one of a network addresses and a folder, the folder comprising the network addresses, and wherein storing the network addresses comprises:

generating a category corresponding to the folder;

determining the network address of the folder as the network address associated with the category, and storing the network address in the search database.

22. The method of claim 21, wherein the folder comprises at least one of a subfolder and a network address, the subfolder comprises another subfolder or another network address, and the storing of the network address comprises:

generating a subcategory corresponding to the subfolder, determining the network address of the subfolder as the network address associated with the subcategory, and storing the network address in the search database.

23. The method of claim 19, wherein the receiving of the favorites list is performed at a condition comprising when the favorites list set in the web browser is updated, periodically, or when a request for a registration of favorites is received from the user terminal.

* * * * *